SOLID STATE DETECTOR AND ELECTROLUMINESCENT DISPLAY SYSTEM

Filed Sept. 22, 1966 3 Sheets-Sheet 1

INVENTOR
THOMAS L. ROBINSON

BY [signature]

AGENT

SOLID STATE DETECTOR AND ELECTROLUMINESCENT DISPLAY SYSTEM

Filed Sept. 22, 1966 3 Sheets-Sheet 2

INVENTOR
THOMAS L. ROBINSON

BY Allen J. Jaffe

AGENT

Jan. 27, 1970 T. L. ROBINSON 3,492,487

SOLID STATE DETECTOR AND ELECTROLUMINESCENT DISPLAY SYSTEM

Filed Sept. 22, 1966 3 Sheets-Sheet 3

INVENTOR
THOMAS L. ROBINSON

BY

AGENT

United States Patent Office 3,492,487

Patented Jan. 27, 1970

3,492,487

SOLID STATE DETECTOR AND ELECTROLUMINESCENT DISPLAY SYSTEM

Thomas L. Robinson, East Aurora, N.Y., assignor to Cornell Aeronautical Laboratory, Inc., Buffalo, N.Y., a corporation of New York Filed Sept. 22, 1966, Ser. No. 581,350
Int. Cl. H01j 39/12, 31/50
U.S. Cl. 250—213 8 Claims

ABSTRACT OF THE DISCLOSURE

An improved solid state detector and electroluminescent display system having a detector panel X- and Y-axis electrodes and photosensitive elements therebetween, the centers of which photosensitive elements are randomly arranged with respect to the intersection points of the X- and Y-axis electrodes; the system also having a display panel having X- and Y-axis electrodes with phospher sandwiched therebetween, one of the X- and Y-axis electrodes being of much finer size than the other.

This invention relates to an improved solid state detector and electroluminescent display system including improved detection and display panels for use as a part thereof.

A primary object of the present invention is to provide a solid state detector and display system wherein the detector and display panels can be flatter and thinner than those used heretofore.

Another object of the present invention is to provide a solid state detector and display system having greater small signal sensitivity than prior art systems.

Another object of the present invention is to provide a solid state detector and display system permitting higher scanning rates than prior art systems.

Another object of the present invention is to provide an improved detector panel that is of relatively low cost to fabricate.

Another object of the present invention is to provide an inexpensive high resolution display panel.

Another object of the present invention is to provide an improved cross grid display panel wherein "cross talk" or glow along the axes of a glowing phosphor spot is eliminated without increasing the background illumination.

Still other objects and advantages of the invention will be apparent from the following description of preferred embodiments thereof, illustrated in the accompanying drawings wherein.

THE DETECTOR AND DISPLAY SYSTEM

Figure 1:
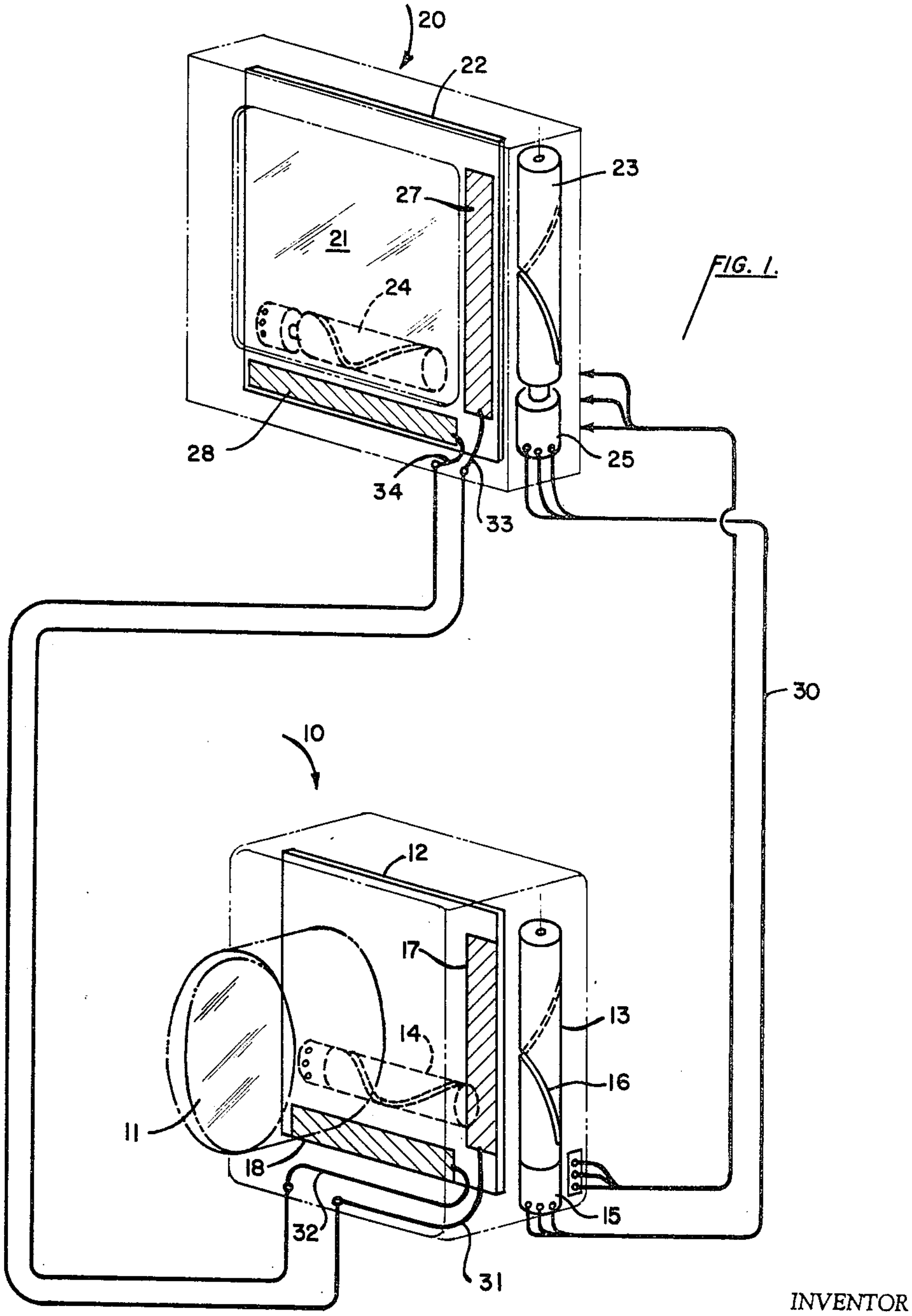
FIGURE 1 is a simplified view of the improved detector and display system.

Referring to FIGURE 1, indicated generally at 10 is a detection or receiving system comprising a receiving lens 11, a detector mosaic or panel 12 and a pair of light beam scanning mechanisms 13 and 14, respectively, for the vertical and horizontal axis of the detector mosaic or panel.

Also shown in FIGURE 1 is an electroluminescent display system indicated generally at 20 comprising a viewing screen 21, a display panel 22 and a pair of light beam scanning mechanisms 23 and 24, respectively, for the vertical and horizontal axis of the display panel.

The light beam scanning mechanisms may take any convenient form. Shown here, for example, is a mechanism comprising a cylindrical, elongated hollow drum 13 rotatably mounted on a control base 15. Mounted interiorly of drum 13 is a suitable light source (not shown) adapted to pass light of uniform intensity through a helical slot 16 wrapped about the periphery of drum 13 and extending the length thereof. Of course, as is conventional, an apertured slit (not illustrated) is located below helical slot 16 to provide a moving spot of light. The control base 15 of beam scanner 13 is electrically connected to the control base 25 of scanner 23 by means of leads 30; such that the two scanners rotate in synchronism as is well-known to those skilled in the art. In a like manner (not shown) scanners 14 and 24 are synchronized. As is apparent, scanners 14, 23, and 24 are identical in construction to scanner 13; therefore, no separate description thereof is deemed necessary. Space adjacent scanners 13 and 14 and extending the length thereof, are a pair of photoswitches 17 and 18 which are suitably mounted on detector panel 12. In like manner, a pair of display panel mounted photoswitches 27 and 28 are spaced adjacent scanners 23 and 24 and extend the length thereof.

Photoswitches 17 and 18 are part of a circuit having a pair of output signal leads 31 and 32. Photoswitches 27 and 28 are a part of a circuit having input signal leads 33 and 34.

The construction of the detector and display panels will be discussed in greater detail hereinbelow. For now, however, suffice it to say that detector panel 12 has mounted thereon a network of essentially planar cross grid electrodes with photosensitive detector elements located adjacent the intersections of the vertical and horizontal grids. These photosensitive detector elements can be chosen so as to be sensitive to any form of light, as for example, infrared or visible. It will be assumed for illustration purposes that the detectors are sensitive to infrared light. The display panel also contains a network of vertical and horizontal essentially planar cross grid electrodes with a layer of electroluminescent phosphor located between the grids as will be discussed in greater detail later.

The operation of the improved system will now be discussed.

As is well-known, the resistivity of the photodetectors vary as an inverse function of the light intensity impinging thereagainst. Thus, the voltage across the detector increases as the intensity of the existing light increases. This increased voltage will appear across output leads 31 and 32 only when the steady light beam from scanner 13 and 14 shunts out the relatively high resistance of the photoswitches 17 and 18 at an area thereof which constitutes respectively the vertical and horizontal projections of the excited detector. In other words, a voltage signal that is a function of the intensity of light impinging against a particular detector element will appear across output leads 31 and 32 when the scanning beams impinge on the photoswitches at the coordinates of that detector. This signal suitably amplified is applied to the input leads 33 and 34 of the display panel. As is well-known, the electroluminescent phosphor will glow with an intensity that is proportional to the exciting voltage thereacross. Since the scanners of the display panel are synchronized to rotate with their respective counterparts of the detector panel, the high resistance of the photoswitches 27 and 28 will be shunted out only at the same coordinates of the shunted out photoswitches of the detector panel. Thus, the input voltage signal will be allowed to appear across the electroluminescent phosphor in the same point as the excited detector, allowing only that electroluminescent phosphor to glow with an intensity that is proportional to the intensity of the light that impinged on the detector element. In this manner, the infrared light impinging on the detector array is converted into a visible image on the display array.

It is important to note that the detector display system operates with steady uniform intensity light beam scanning as opposed to conventional electron beam or electron beam conversion to visible light scanning. The advantage of steady light beam scanning are threefold.

First, the size of the detector and display panels can be greatly reduced because relatively long electron guns and relatively large vacuum housings are no longer required.

Secondly, the noise associated with electron beam devices occasioned by the nonuniform electron flow is eliminated with the steady, uniform intensity light beam scanners. This greatly increases the small signal sensitivity of the system because the danger of small signals being overridden by the nonuniform electron beam is no longer present.

Thirdly, the heat associated with the electron with the electron beam is eliminated in that the steady light impingement is a relatively cold process. This means that there is no longer present the problem of hysteresis-type retention of the signal by the photoswitch after the beam has been removed. Thus, a greater scanning rate is possible with the steady light beam scanning.

THE DETECTOR PANEL

Referring now in greater detail to the detector panel, attention is directed to FIGURES 2–5. The detector panel comprises a thin, rectangular substrate or base 121 which can be of an organic or inorganic material. Suitably mounted on substrate 121 is an elongated vertical grid terminal or bus board 122, hereinafter called the Y-bus board. Also mounted on substrate 121 is an elongated horizontal grid terminal or bus board 123, hereinafter called the X-bus board. The vertical photoswitch layer 17, hereinfater called the Y-photo switch, is mounted on substrate 121 adjacent and in electrical connection with the Y-bus board 122. Similarly, the horizontal photo switch layer 18, hereinafter called the X-photo switch, is mounted on substrate 121 adjacent and in electrical connection with the X-bus board 123. Electrically connected to photo switch 17 are a plurality of parallel X-grids or electrodes 124, shown greatly enlarged in the figure. Electrically connected to photo switch 18 are a plurality of parallel Y-grids or electrodes 125. These grids may be fabricated of an evaporated conductive material such as gold or silver or they could be of an electroplated metal structure as rhodium, for example. Intermediate, the X- and Y-grids and in the vicinity of the intersections thereof, are a plurality of photo detector elements 126, shown for convenience as squares. These detector elements can be semiconductors, insulator or metal materials having high frequency and amplitude characteristics or they can be linear thin film field effect transistors. Bus boards 122 and 123 are suitably wired together as shown such that the output signal appears across leads 31 and 32.

Figure 2:
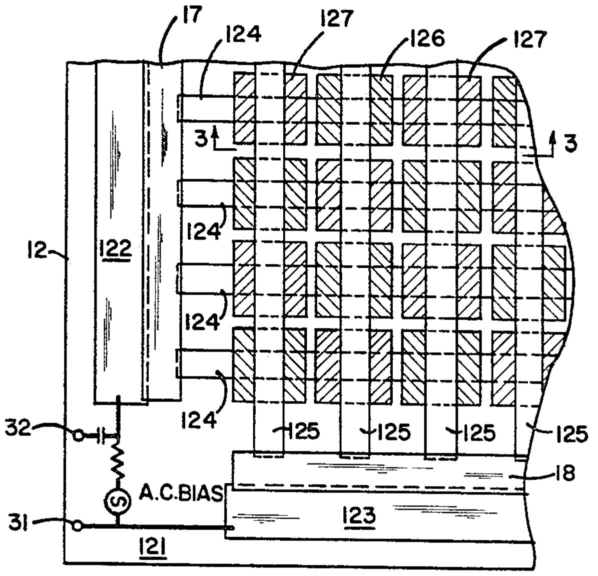
FIGURE 2 is a schematic fragmentary enlarged elevational view of a detector panel array constructed in accordance with the present invention.
Figure 3:
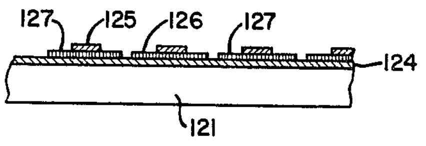
FIGURE 3 is a fragmentary sectional view thereof taken along line 3—3 of FIGURE 2.
Figure 4:
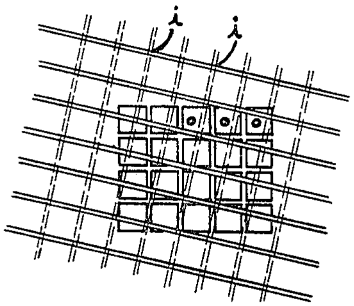
FIGURE 4 is a fragmentary view of a detector panel array illustrating the principle of random alignment of the cross grids with respect to the detector elements.

An important feature of the improved detector panel arrangement is that the precise alignment shown in FIGURE 2 is not necessary. In other words, it has been found that it is not essential that the grid intersections lie in the center of the detector elements. It is also not essential that the X- and Y-grids be perpendicular to one another. Thus the alignment shown in FIGURE 4 is permissible, wherein the intersections, *i* of the X- and Y-grids are randomly located with respect to the center, *o*, of the detector elements. Even though varying the intersection of the X- and Y-grids from the center of the detector element causes the resistance at the four corners thereof to become unequal, the net resistance of the detector remains the same in that movement of the intersection closer to one corner results in movement further away from another corner. Thus, while the resistance of one path increases, the resistance of the other path decreases proportionately. The random arrangement is therefore one that is self-compensating. As a practical consideration, random alignment means cheaper panels since less time, precision, and skill is involved in placing the grids and detectors on the substrate.

Figure 5:
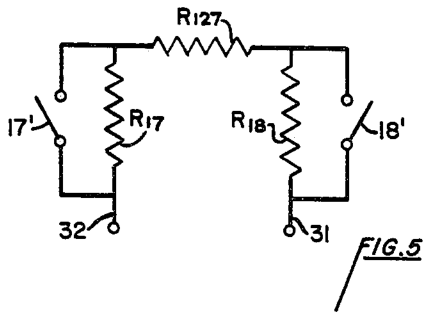
FIGURE 5 is a schematic showing of the equivalent circuit of the detector panel of FIGURE 2 illustrating the operating principles thereof.

In FIGURE 5 is illustrated an equivalent circuit diagram of the current path when the light beam scans the coordinates, the detector at 127, for example. $R_{127}$ represents the variable resistance of the detector which as stated earlier is inverse function of the impinging light intensity. $R_{17}$ and $R_{18}$ represents the normally high resistance of the photo switches 17 and 18 before energized by the scanning beams. Switches 17' and 18' when closed, represent the low short circuited resistance of the photoswitches 17 and 18 when energized by the scanning beams. $R_{17}$ and $R_{18}$ are chosen to be much higher than $R_{127}$ such that $R_{127}$ has virtually no effect on the voltage across output leads 31 and 32. When, however, the photoswitches are energized whereat switches 17' and 18' are closed shunting out $R_{17}$ and $R_{18}$, the output at leads 31 and 32 then becomes an inverse function of $R_{127}$; and, thus, a direct function of the exciting light intensity which has been assumed to be infrared.

THE DISPLAY PANEL

Figure 6:
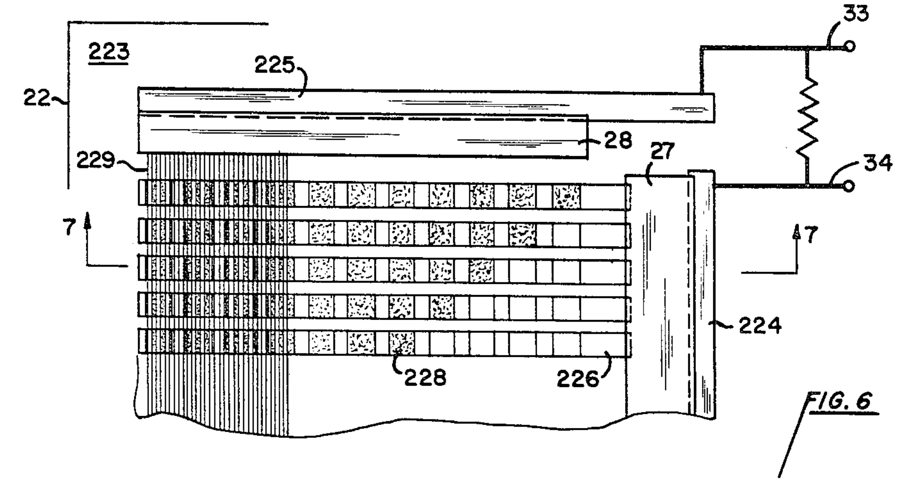
FIGURE 6 is a schematic fragmentary elevational view of one form of display panel array constructed in accordance with the present invention.
Figure 7:
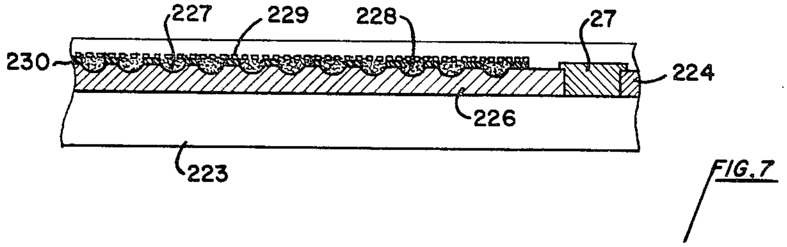
FIGURE 7 is a fragmentary sectional view thereof taken along line 7—7 of FIGURE 6.

In FIGURES 6 and 7 a thin rectangular substrate or base 223 supports an elongated vertical bus board 224, hereinafter called the Y-bus board, and an elongated horizontal bus board 225, hereinafter called the X-bus board. Mounted on substrate 223 and in electrical connection with the Y-bus board 224 is the vetrical photo switch layer 27, hereinafter called the Y-photoswitch. Also, mounted on substrate 223 and in electrical connection with the X-bus board 225 is the horizontal photoswitch layer 28, hereinafter called X-photo switch. Electrically connected to photoswitch 27 are a plurality of parallel horizontal coarse grids or electrodes 226, which may be produced by a combination of electroplating and etching. These coarse grids contain shallow depressions 227. Received in the depressions 227 and overflowing therefrom is a coating of electroluminescent phosphors 228. Electrically connected to the X-photoswitch 28 are a plurality of very fine opaque vertical grids or electrodes 229, which may be produced, for example, by vacuum deposition. As shown in FIGURE 7, the fine grids are spaced from the coarse grids by a suitable insulating material 230. For the sake of clarity, insulator 230 has been left out of FIGURE 6. The phosphors 228 extend outwardly of depressions 227 and fill the spaces between the fine grids 229 as shown in FIGURES 6 and 7. Input leads 33 and 34 are suitably connected to terminals 225 and 226 as shown in FIGURE 6.

Figure 8:
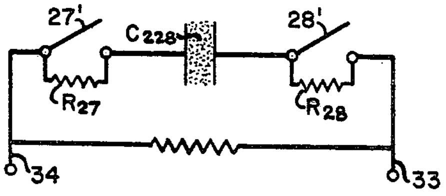
FIGURE 8 is a schematic showing of the equivalent circuit of the display panel of FIGURE 7 illustrating the operating principles thereof.

In FIGURE 8 is illustrated a simplified equivalent circuit of the display panel of FIGURE 6. $C_{228}$ represents the equivalent capacitance of any phosphor element while 27' and $R_{27}$ and 28' and $R_{28}$ represent the equivalent circuits, respectively, of the Y- and X-photoswitches. The input voltage, which is a function of the infrared intensity impinging on the detector elements is applied across terminals 33 and 34. As shown in FIGURE 8 the resistance of the photoswitches 27 and 28 has the greatest voltage drop thereacross, leaving insufficient voltage to excite the phosphor to a glowing state. When, however, the scanning beams fall on a particular area of each photoswitch the resistance thereat greatly decreases, represented by closure of switches 27′ and 28′, the total input voltage, appears across the phosphor element $C_{228}$ causing it to glow with an intensity proportional to the input voltage.

As will be apparent to those skilled in the art, the "cross talk" or glow that would ordinarily exist along the X- and Y-axis of the glowing phosphor spot can be eliminated by suitably choosing the frequency of the excitation signal and the intensity of the scanning beam such that the net reactance of the other phosphor spots in the "cross" would be high enough to drop a voltage lower than that necessary to cause these other spots to glow.

As pointed out earlier, the fine grids are opaque and therefore less costly to produce than the transparent grids of the prior art. This opaqueness does not destroy the resolution since the image appears between the fine lines rather than through. This allows a planar, thinner and more compact structure than prior art display panels.

Figure 9:
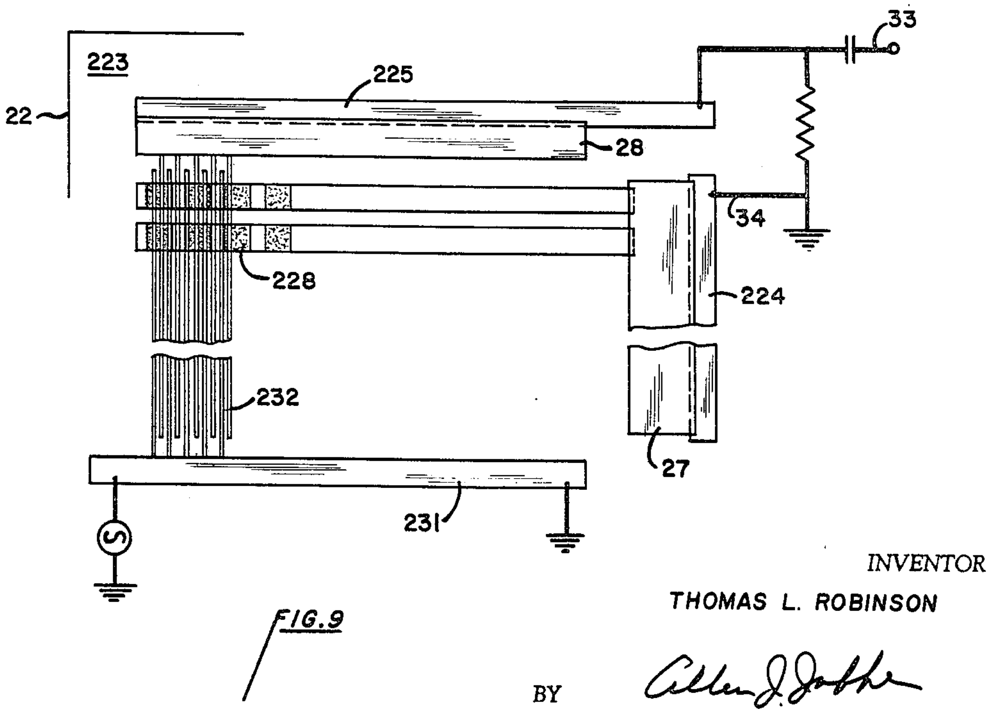
FIGURE 9 is a schematic fragmentary elevational view of a second form of display panel array constructed in accordance with the present invention.

In FIGURE 9 is shown a modification of the display panel of FIGURE 6 wherein like reference numerals refer to like parts. Here an auxiliary bus board 231 is provided with a plurality of fine grids 232 extending therefrom and fitting in an interdigital manner between the fine grids 229 of bus board 225. These auxiliary grids act as control grids to vary the intensity of the phosphors in much the same manner as the control grid of a triode varies the current flowing therethrough. With this auxiliary arrangement a greater range of gray tones is possible.

While preferred embodiments of the invention have been described and illustrated many other forms will occur to those skilled in the art. For example, the photoswitches can be manufactured as thin film field effect transistor switches for high frequency response. It is therefore intended that the inventive concept is only to be limited by the scope of the appended claims.

What is claimed is:

1. In an improved solid state detection and electroluminescent display system comprising:

(a) a detection panel containing elements responsive to light impinging thereagainst;
(b) photosensitive switch means electrically connected with said elements;
(c) means for scanning said photosensitive switch means with light beams of steady uniform intensity;
(d) a display panel containing a layer of electroluminescent phosphors;
(e) second photosensitive switch means electrically connected with said phosphors;
(f) means for scanning said second photosensitive switch means with light beams of steady uniform intensity; and,
(g) means electrically connecting said first and second photosensitive switches.
(h) said detection and display panels each comprising a thin rectangular substrate, said first and second photosensitive switches each comprising a pair of photoswitches mounted on their respective substrate adjacent two perpendicular edges thereof;
(i) a plurality of first parallel electrodes on said detection substrate and in electrical communication with one of said pair of detection panel photoswitches;
(j) a plurality of second parallel electrodes mounted on said detection substrate at generally right angles to said first electrodes and in electrical communication with the other of said pair of detection panel photoswitches, said light responsive elements of said detection panel being centered generally at the intersection of said first and second electrodes;

(k) a plurality of third parallel electrodes on said display substrate and in electrical communication with one of said pair of display panel photoswitches;
(l) a plurality of fourth parallel electrodes on said display substrate and in electrical communication with the other of said pair of display panel photoswitches, the fourth electrodes being opaque and much thinner than said third electrodes; and wherein said first scanner means comprise a pair of uniform intensity light beam scanners for said pair of detection panel photoswitches, and said second scanning means comprise a pair of uniform intensity light beam scanners for said pair of display panel photoswitches.

2. In an improved solid state detection panel comprising:

(a) a substrate;
(b) an X-axis switch means on said substrate;
(c) a Y-axis switch means on said substrate at generally right angles to said X-axis switch means;
(d) a plurality of X-axis electrodes connected to said Y-axis switch means to provide a plurality of intersection points with the Y-axis in electrodes;
(e) a plurality of Y-axis electrodes connected to said X-axis switch means, and;
(f) a plurality of light sensitive detector elements intermediate the X- and Y-axis electrodes, the centers of each being randomly arranged with respect to each of the X- and Y-axis electrode intersection points.

3. The improved detection panel of claim 2 wherein said light sensitive detector elements are sensitive to infrared light.

4. The improved detection panel of claim 2 wherein said X- and Y-axis switch means are photosensitive switches.

5. In an improved solid state electroluminescent display panel comprising:

(a) a substrate;
(b) an X-axis switch means on said substrate;
(c) a Y-axis switch means on said substrate at generally right angles to said X-axis switch means;
(d) a plurality of X-axis electrodes connected to said Y-axis switch means;
(e) a plurality of opaque Y-axis electrodes connected to said X-axis switch means and of much finer size than said X-axis electrodes, and;
(f) a layer of electroluminescent phosphor on said substrate filling the spaces between said X- and Y-axis electrodes.

6. The panel of claim 8 wherein said X- and Y-axis switch means are photosensitive switch means.

7. The panel of claim 8 wherein said X-axis electrodes contain a plurality of shallow recesses for a portion of the electroluminescent phosphor layer.

8. The panel of claim 7 further comprising:

(g) an auxiliary control grid on said substrate and fitting interdigitally between the Y-axis electrodes.

References Cited

UNITED STATES PATENTS

| | | | |
|---|---|---|---|
| 3,152,257 | 10/1964 | Van Santen et al. | 250—213 X |
| 3,165,634 | 1/1965 | Raymond | 250—213 X |
| 3,183,360 | 5/1965 | Van Santen | 250—208 |
| 3,265,928 | 8/1966 | Nishino | 315—169 X |
| 3,366,836 | 1/1968 | Harvey | 315—169 |

WALTER STOLWEIN, Primary Examiner

U.S. Cl. X.R.

313—108; 340—166